United States Patent
Lai et al.

(10) Patent No.: US 10,987,589 B2
(45) Date of Patent: *Apr. 27, 2021

(54) SYSTEMS AND METHODS FOR DETERMINING GAME LEVEL ATTRIBUTES BASED ON PLAYER SKILL LEVEL PRIOR TO GAME PLAY IN THE LEVEL

(71) Applicant: Zynga Inc., San Francisco, CA (US)

(72) Inventors: Peter Pao Lai, South San Francisco, CA (US); Sora Bai, San Francisco, CA (US); David Baack, Daly City, CA (US); Katherine Lee, San Francisco, CA (US)

(73) Assignee: Zynga Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/427,925

(22) Filed: May 31, 2019

(65) Prior Publication Data

US 2019/0308105 A1 Oct. 10, 2019

Related U.S. Application Data

(63) Continuation of application No. 15/593,807, filed on May 12, 2017, now Pat. No. 10,363,487, which is a
(Continued)

(51) Int. Cl.
*A63F 13/67* (2014.01)
*A63F 13/537* (2014.01)
(Continued)

(52) U.S. Cl.
CPC ............ *A63F 13/67* (2014.09); *A63F 3/0423* (2013.01); *A63F 13/30* (2014.09); *A63F 13/32* (2014.09);
(Continued)

(58) Field of Classification Search
None
See application file for complete search history.

(56) References Cited

U.S. PATENT DOCUMENTS

| 4,015,846 A | 4/1977 | Runte et al. |
| 4,679,789 A | 7/1987 | Okada |

(Continued)

FOREIGN PATENT DOCUMENTS

WO    WO-2005061067 A1    7/2005

OTHER PUBLICATIONS

US 10,279,265 B2, 05/2019, Dhawan et al. (withdrawn)
(Continued)

*Primary Examiner* — Ronald Laneau
(74) *Attorney, Agent, or Firm* — Schwegman Lundberg & Woessner, P.A.

(57) ABSTRACT

A system, a machine-readable storage medium storing instructions, and a computer-implemented method are described herein for a System Tuner for customizing a player's experience. The System Tuner calculates a player skill level for a player. The System Tuner modifies at least one attribute of a second game level based on the player skill level prior to game play of the player in the second game level. The System Tuner detects game play of the player in the second game level. The System Tuner identifies a difference between a current rate of progression of the player and a reference rate of progression. The System Tuner triggers the modified attribute of the second game according to an extent of the difference between the current rate of progression and the reference rate of progression.

20 Claims, 7 Drawing Sheets

Related U.S. Application Data continuation of application No. 14/546,865, filed on Nov. 18, 2014, now Pat. No. 9,675,889.

(60) Provisional application No. 62/048,362, filed on Sep. 10, 2014.

(51) Int. Cl.

| | | |
|---|---|---|
| *A63F 13/30* | (2014.01) | |
| *A63F 3/04* | (2006.01) | |
| *A63F 13/35* | (2014.01) | |
| *A63F 13/79* | (2014.01) | |
| *A63F 13/798* | (2014.01) | |
| *A63F 13/32* | (2014.01) | |
| *A63F 13/327* | (2014.01) | |
| *A63F 13/33* | (2014.01) | |
| *A63F 13/332* | (2014.01) | |
| *A63F 13/335* | (2014.01) | |
| *A63F 13/87* | (2014.01) | |
| *A63F 13/92* | (2014.01) | |
| *A63F 13/837* | (2014.01) | |
| *A63F 13/822* | (2014.01) | |

(52) U.S. Cl.
CPC ............ *A63F 13/327* (2014.09); *A63F 13/33* (2014.09); *A63F 13/332* (2014.09); *A63F 13/335* (2014.09); *A63F 13/35* (2014.09); *A63F 13/537* (2014.09); *A63F 13/79* (2014.09); *A63F 13/798* (2014.09); *A63F 13/87* (2014.09); *A63F 13/92* (2014.09); *A63F 13/822* (2014.09); *A63F 13/837* (2014.09)

(56) References Cited

U.S. PATENT DOCUMENTS

| | | | |
|---|---|---|---|
| 5,370,399 | A | 12/1994 | Liverance |
| 5,377,100 | A | 12/1994 | Pope et al. |
| 5,683,082 | A | 11/1997 | Takemoto et al. |
| 5,813,913 | A | 9/1998 | Berner et al. |
| 5,968,063 | A | 10/1999 | Chu et al. |
| 5,970,479 | A | 10/1999 | Shepherd |
| 5,971,850 | A | 10/1999 | Linerance |
| 6,106,395 | A | 8/2000 | Begis |
| 6,174,237 | B1 | 1/2001 | Stephenson |
| 6,190,370 | B1 | 2/2001 | Tsui |
| 6,213,873 | B1 | 4/2001 | Gasper et al. |
| 6,302,793 | B1 | 10/2001 | Fertitta, III et al. |
| 6,358,148 | B1 | 3/2002 | Tanaka |
| 6,375,570 | B1 | 4/2002 | Poole |
| 6,579,177 | B2 | 6/2003 | Mraovic |
| 6,641,482 | B2 | 11/2003 | Masuyama et al. |
| 6,648,760 | B1 | 11/2003 | Nicastro |
| 6,702,675 | B2 | 3/2004 | Poole et al. |
| 6,758,752 | B1 | 7/2004 | Miyagawa |
| 7,076,445 | B1 | 7/2006 | Cartwright |
| 7,094,147 | B2 | 8/2006 | Nakata et al. |
| 7,192,345 | B2 | 3/2007 | Muir et al. |
| 7,367,882 | B2 | 5/2008 | Fukutome |
| 7,425,175 | B2 | 9/2008 | Nakano et al. |
| 7,717,781 | B2 | 5/2010 | Hattori et al. |
| 7,775,866 | B2 | 8/2010 | Mizuguchi et al. |
| 7,818,399 | B1 | 10/2010 | Ross, Jr. et al. |
| 7,983,895 | B2 | 7/2011 | Mcentee et al. |
| 8,016,653 | B2 | 9/2011 | Pendleton et al. |
| 8,096,879 | B2 | 1/2012 | Takeda |
| 8,161,008 | B2 | 4/2012 | Zhang et al. |
| 8,210,925 | B2 | 7/2012 | Johnson |
| 8,219,509 | B2 | 7/2012 | Ansari et al. |
| 8,303,416 | B1 | 11/2012 | Thakkar et al. |
| 8,313,370 | B2 | 11/2012 | Rogers et al. |
| 8,366,527 | B2 | 2/2013 | Takeda |
| 8,401,710 | B2 | 3/2013 | Budhraja et al. |
| 8,439,759 | B1 | 5/2013 | Mello et al. |
| 8,475,274 | B2 | 7/2013 | Jacob |
| 8,496,531 | B2 | 7/2013 | Youm |
| 8,523,660 | B2 | 9/2013 | Jacob |
| 8,529,355 | B2 | 9/2013 | Hiratake et al. |
| 8,535,149 | B2 | 9/2013 | Ziegler et al. |
| 8,550,920 | B1 | 10/2013 | Allen et al. |
| 8,585,505 | B2 | 11/2013 | Youm |
| 8,622,828 | B1 | 1/2014 | Harrington |
| 8,632,072 | B2 | 1/2014 | Loveland |
| 8,663,004 | B1 | 3/2014 | Xu |
| 8,668,581 | B2 | 3/2014 | Arnone et al. |
| 8,701,103 | B1 | 4/2014 | Hsu et al. |
| 8,721,413 | B2 | 5/2014 | Mohammed et al. |
| 8,734,243 | B2 | 5/2014 | Harrington |
| 8,764,561 | B1 | 7/2014 | Lan et al. |
| 8,944,908 | B1 | 2/2015 | Wakeford et al. |
| 9,033,804 | B2 | 5/2015 | Takagi et al. |
| 9,039,535 | B2 | 5/2015 | Boss et al. |
| 9,101,834 | B2 | 8/2015 | LeTourneau et al. |
| 9,104,834 | B2 | 8/2015 | Bickford et al. |
| 9,132,353 | B2 | 9/2015 | Otomo |
| 9,138,641 | B2 | 9/2015 | Rogers et al. |
| 9,153,075 | B2 | 10/2015 | Ueno et al. |
| 9,186,584 | B2 | 11/2015 | Morrison et al. |
| 9,205,338 | B1 | 12/2015 | Wakeford et al. |
| 9,218,717 | B2 | 12/2015 | Indrakumar |
| 9,266,026 | B2 | 2/2016 | Jacob |
| 9,272,208 | B1 | 3/2016 | LeTourneau et al. |
| 9,415,305 | B2 | 8/2016 | Cudak et al. |
| 9,533,226 | B2 | 1/2017 | Wakeford et al. |
| 9,566,518 | B2 | 2/2017 | Branson et al. |
| 9,573,063 | B2 | 2/2017 | Branson et al. |
| 9,604,145 | B2 | 3/2017 | Morrison et al. |
| 9,649,568 | B2 | 5/2017 | Wada |
| 9,675,889 | B2 | 6/2017 | Lai et al. |
| 9,724,606 | B2 | 8/2017 | Lai et al. |
| 9,737,815 | B2 | 8/2017 | Dhawan et al. |
| 9,757,650 | B2 | 9/2017 | Mehra et al. |
| 10,112,112 | B2 | 10/2018 | Lai et al. |
| 10,279,264 | B1 | 5/2019 | Aghdaie et al. |
| 10,315,114 | B2 | 6/2019 | Dhawan et al. |
| 10,363,487 | B2 | 7/2019 | Lai et al. |
| 10,384,132 | B2 | 8/2019 | Ware et al. |
| 10,409,457 | B2 | 9/2019 | Baack et al. |
| 10,456,686 | B2 | 10/2019 | Patton et al. |
| 10,556,182 | B2 | 2/2020 | Ntoulas et al. |
| 10,561,944 | B2 | 2/2020 | Ware et al. |
| 10,918,952 | B2 | 2/2021 | Ware et al. |
| 10,940,392 | B2 | 3/2021 | Dhawan et al. |
| 2002/0016954 | A1 | 2/2002 | Charisius et al. |
| 2002/0072418 | A1 | 6/2002 | Masuyama et al. |
| 2003/0040350 | A1 | 2/2003 | Nakata et al. |
| 2003/0083009 | A1 | 5/2003 | Freyman et al. |
| 2003/0100369 | A1 | 5/2003 | Gatto et al. |
| 2003/0114219 | A1 | 6/2003 | McClintic |
| 2003/0153373 | A1 | 8/2003 | Squibbs |
| 2003/0220796 | A1 | 11/2003 | Aoyama et al. |
| 2003/0224858 | A1 | 12/2003 | Yoseloff et al. |
| 2004/0018878 | A1 | 1/2004 | Silverman |
| 2004/0019391 | A1 | 1/2004 | Ferraz et al. |
| 2004/0053665 | A1 | 3/2004 | Baerlocher |
| 2004/0106452 | A1 | 6/2004 | Nguyen et al. |
| 2004/0121838 | A1 | 6/2004 | Hughs-Baird et al. |
| 2004/0152505 | A1 | 8/2004 | Herrmann et al. |
| 2005/0043075 | A1 | 2/2005 | Lin et al. |
| 2005/0202861 | A1 | 9/2005 | Dougherty et al. |
| 2005/0266908 | A1 | 12/2005 | Hattori et al. |
| 2005/0277456 | A1 | 12/2005 | Mizuguchi et al. |
| 2005/0289523 | A1 | 12/2005 | Spektor et al. |
| 2006/0003841 | A1 | 1/2006 | Kobayashi et al. |
| 2006/0121991 | A1 | 6/2006 | Borinik et al. |
| 2006/0181535 | A1 | 8/2006 | Watt et al. |
| 2006/0258415 | A1 | 11/2006 | Nakano et al. |
| 2006/0281535 | A1 | 12/2006 | Bogan |
| 2006/0287046 | A1 | 12/2006 | Walker et al. |
| 2007/0026934 | A1 | 2/2007 | Herbrich et al. |
| 2007/0054717 | A1 | 3/2007 | Youm et al. |
| 2007/0060038 | A1 | 3/2007 | Yamashita et al. |

(56) References Cited

U.S. PATENT DOCUMENTS

| | | |
|---|---|---|
| 2007/0060338 A1 | 3/2007 | Kefaloukos et al. |
| 2007/0066403 A1 | 3/2007 | Conkwright |
| 2007/0156727 A1 | 7/2007 | Lim |
| 2007/0226678 A1 | 9/2007 | Li et al. |
| 2007/0265718 A1 | 11/2007 | Graepel et al. |
| 2008/0127163 A1 | 5/2008 | Fong et al. |
| 2008/0161079 A1 | 7/2008 | Wei |
| 2008/0182635 A1 | 7/2008 | Chiu |
| 2008/0227525 A1 | 9/2008 | Kelly et al. |
| 2008/0266250 A1 | 10/2008 | Jacob |
| 2008/0268943 A1 | 10/2008 | Jacob |
| 2009/0131152 A1 | 5/2009 | Busse |
| 2009/0149246 A1 | 6/2009 | Opaluch |
| 2009/0209323 A1 | 8/2009 | Ansari et al. |
| 2009/0215526 A1 | 8/2009 | Matsumoto et al. |
| 2009/0253517 A1 | 10/2009 | Bererton et al. |
| 2010/0144424 A1 | 6/2010 | Rogers et al. |
| 2010/0144444 A1 | 6/2010 | Graham |
| 2010/0279762 A1 | 11/2010 | Sohn et al. |
| 2010/0304839 A1 | 12/2010 | Johnson |
| 2011/0086702 A1 | 4/2011 | Borst et al. |
| 2011/0165939 A1 | 7/2011 | Borst et al. |
| 2011/0281639 A1 | 11/2011 | Porat et al. |
| 2011/0312398 A1 | 12/2011 | Ziegler et al. |
| 2011/0319148 A1 | 12/2011 | Kinnebrew et al. |
| 2012/0010734 A1 | 1/2012 | Youm |
| 2012/0013072 A1 | 1/2012 | Loveland |
| 2012/0047156 A1 | 2/2012 | Jarvinen et al. |
| 2012/0088562 A1 | 4/2012 | Mohammed et al. |
| 2013/0072287 A1 | 3/2013 | Okuaki et al. |
| 2013/0083003 A1 | 4/2013 | Perez et al. |
| 2013/0130807 A1 | 5/2013 | Youm et al. |
| 2013/0151603 A1 | 6/2013 | Lobb et al. |
| 2013/0154958 A1 | 6/2013 | Clavin et al. |
| 2013/0172061 A1 | 7/2013 | Iosilevsky et al. |
| 2013/0184080 A1 | 7/2013 | Kniberg et al. |
| 2013/0205276 A1 | 8/2013 | Hirsch et al. |
| 2013/0225260 A1 | 8/2013 | Cudak et al. |
| 2013/0311951 A1 | 11/2013 | Jacob |
| 2013/0324253 A1 | 12/2013 | Hiratake et al. |
| 2014/0057722 A1 | 2/2014 | Justice et al. |
| 2014/0066176 A1 | 3/2014 | Letourneau et al. |
| 2014/0108939 A1 | 4/2014 | Mahapatra et al. |
| 2014/0274258 A1 | 9/2014 | Hartmann et al. |
| 2014/0274304 A1* | 9/2014 | Haswell ............... A63F 13/10 463/23 |
| 2014/0295925 A1 | 10/2014 | Gladwell et al. |
| 2015/0209672 A1 | 7/2015 | Otomo |
| 2015/0246286 A1 | 9/2015 | Branson et al. |
| 2015/0352436 A1 | 12/2015 | Pieron et al. |
| 2015/0375120 A1* | 12/2015 | Lim ...................... A63F 13/67 463/23 |
| 2016/0067601 A1 | 3/2016 | Mehra et al. |
| 2016/0067605 A1 | 3/2016 | Lai et al. |
| 2016/0067610 A1 | 3/2016 | Ware et al. |
| 2016/0067611 A1 | 3/2016 | Ware et al. |
| 2016/0067612 A1 | 3/2016 | Ntoulas et al. |
| 2016/0067613 A1 | 3/2016 | Ntoulas et al. |
| 2016/0067615 A1 | 3/2016 | Lai et al. |
| 2016/0082354 A1 | 3/2016 | Wakeford et al. |
| 2016/0098161 A1 | 4/2016 | Baack et al. |
| 2016/0110962 A1 | 4/2016 | Arnone et al. |
| 2016/0117890 A1 | 4/2016 | Arnone et al. |
| 2016/0256775 A1 | 9/2016 | Gustafson et al. |
| 2016/0274887 A1 | 9/2016 | Sternfeld et al. |
| 2016/0381109 A1 | 12/2016 | Barnett et al. |
| 2016/0381110 A1 | 12/2016 | Barnett et al. |
| 2017/0246538 A1 | 8/2017 | Lai et al. |
| 2017/0246540 A1 | 8/2017 | Lai et al. |
| 2017/0259178 A1 | 9/2017 | Aghdaie et al. |
| 2017/0304722 A1 | 10/2017 | Mehra et al. |
| 2017/0312636 A1 | 11/2017 | Dhawan et al. |
| 2019/0224573 A1 | 7/2019 | Dhawan et al. |
| 2019/0314725 A1 | 10/2019 | Ware et al. |
| 2020/0001184 A1 | 1/2020 | Patton et al. |
| 2020/0222810 A1 | 7/2020 | Ntoulas et al. |
| 2020/0222811 A1 | 7/2020 | Ware et al. |

OTHER PUBLICATIONS

U.S. Appl. No. 14/546,865, U.S. Pat. No. 9,675,889, filed Nov. 18, 2014, Systems and Methods For Determining Game Level Attributes Based on Player Skill Level Prior to Game Play in The Level.

U.S. Appl. No. 15/593,807, filed May 12, 2017, Systems and Methods For Determining Game Level Attributes Based on Player Skill Level Prior to Game Play in The Level.

U.S. Appl. No. 14/569,534, filed Dec. 12, 2014, Determining Hardness Quotients For Level Definition Files Based on Player Skill Level.

U.S. Appl. No. 14/876,208, filed Oct. 6, 2015, Systems and Methods For Replenishment of Virtual Objects Based on Device Orientation.

U.S. Appl. No. 14/601,807, U.S. Pat. No. 9,737,815, filed Jan. 21, 2015, Experimentation and Optimization Service.

U.S. Appl. No. 15/652,800, U.S. Pat. No. 10,315,114, filed Jul. 18, 2017, Experimentation and Optimization Service.

U.S. Appl. No. 16/371,967, filed Apr. 1, 2019, Experimentation and Optimization Service.

U.S. Appl. No. 14/849,291, filed Sep. 9, 2015, Adjusting Object Adaptive Modificationo or Game Level Difficulty and Physical Gestures Through Level Definition Files.

U.S. Appl. No. 14/849,341, filed Sep. 2015, Automated Game Modification Based on Playing Style.

U.S. Appl. No. 14/572,203, U.S. Pat. No. 9,757,650, filed Dec. 16, 2014, Sequencing and Locations of Selected Virtual Objects to Trigger Targetes Game Actions.

U.S. Appl. No. 15/646,953, filed Jul. 11, 2017, Sequencing and Locations of Selected Virtual Objects to Trigger Targeted Game Actions.

U.S. Appl. No. 14/849,354, filed Sep. 9, 2015, Methods and Systems For Adaptive Tuning of Game Events.

"U.S. Appl. No. 13/604,552, Examiner Interview Summary dated Oct. 16, 2015", 3 pgs.

"U.S. Appl. No. 13/604,552, Final Office Action dated Apr. 8, 2015", 8 pgs.

"U.S. Appl. No. 13/604,552, Non Final Office Action dated Jul. 27, 2015", 8 pgs.

"U.S. Appl. No. 13/604,552, Non Final Office Action dated Oct. 31, 2014", 8 pgs.

"U.S. Appl. No. 13/604,552, Notice of Allowance dated Nov. 20, 2015", 5 pgs.

"U.S. Appl. No. 13/604,552, Response filed Jan. 30, 2015 to Non-Final Office Action dated Oct. 31, 2014", 10 pgs.

"U.S. Appl. No. 13/604,552, Response filed Jul. 1, 2015 to Final Office Action dated Apr. 8, 2015", 10 pgs.

"U.S. Appl. No. 13/604,552, Response filed Oct. 14, 2015 to Final Office Action dated Jul. 27, 2015", 11 pgs.

"U.S. Appl. No. 14/018,998, Non Final Office Action dated Oct. 31, 2014", 8 pgs.

"U.S. Appl. No. 14/018,998, Notice of Allowance dated Apr. 8, 2015", 8 pgs.

"U.S. Appl. No. 14/018,998, Response filed Jan. 30, 2015 to Non-Final Office Action dated Oct. 31, 2014", 10 pgs.

"U.S. Appl. No. 14/480,983, Examiner Interview Summary dated Jan. 23, 2017", 3 pgs.

"U.S. Appl. No. 14/480,983, First Action Interview—Pre-Interview Communication dated Oct. 31, 2016", 5 pgs.

"U.S. Appl. No. 14/480,983, Notice of Allowance dated Mar. 29, 2017", 9 pgs.

"U.S. Appl. No. 14/480,983, Response filed Jan. 18, 2017 to First Action Interview—Pre-Interview Communication dated Oct. 31, 2016", 11 pgs.

"U.S. Appl. No. 14/546,865, Amendment Under 37 C.F.R. 1.312 filed Mar. 1, 2017", 9 pgs.

"U.S. Appl. No. 14/546,865, Corrected Notice of Allowance dated Mar. 3, 2017", 4 pgs.

(56) References Cited

OTHER PUBLICATIONS

"U.S. Appl. No. 14/546,865, Examiner Interview Summary dated Dec. 21, 2016", 3 pgs.
"U.S. Appl. No. 14/546,865, Non Final Office Action dated Sep. 15, 2016", 8 pgs.
"U.S. Appl. No. 14/546,865, Notice of Allowance dated Feb. 7, 2017", 5 pgs.
"U.S. Appl. No. 14/546,865, PTO Response to Rule 312 Communication dated Mar. 10, 2017", 2 pgs.
"U.S. Appl. No. 14/546,865, Response filed Dec. 14, 2016 to Non Final Office Action dated Sep. 15, 2016", 12 pgs.
"U.S. Appl. No. 14/569,534, Examiner Interview Summary dated Dec. 13, 2018", 3 pgs.
"U.S. Appl. No. 14/569,534, Final Office Action dated Apr. 20, 2018", 9 pgs.
"U.S. Appl. No. 14/569,534, Non Final Office Action dated Jun. 23, 2017", 9 pgs.
"U.S. Appl. No. 14/569,534, Non Final Office Action dated Aug. 28, 2018", 23 pgs.
"U.S. Appl. No. 14/569,534, Notice of Allowance dated Mar. 27, 2019", 14 pgs.
"U.S. Appl. No. 14/569,534, Response filed Jul. 20, 2018 to Final Office Action dated Apr. 20, 2018", 13 pgs.
"U.S. Appl. No. 14/569,534, Response filed Nov. 28, 2018 to Non Final Office Action dated Nov. 28, 2018", 16 pgs.
"U.S. Appl. No. 14/569,534, Response filed Dec. 22, 2017 to Non Final Office Action dated Jun. 23, 2017", 14 pgs.
"U.S. Appl. No. 14/572,203, Examiner Interview Summary dated Mar. 10, 2017", 4 pgs.
"U.S. Appl. No. 14/572,203, Examiner Interview Summary dated Apr. 7, 2016", 19 pgs.
"U.S. Appl. No. 14/572,203, Examiner Interview Summary dated Jun. 29, 2016", 3 pgs.
"U.S. Appl. No. 14/572,203, Final Office Action dated Sep. 13, 2016", 13 pgs.
"U.S. Appl. No. 14/572,203, First Action Interview dated Feb. 26, 2016", 15 pgs.
"U.S. Appl. No. 14/572,203, First Action Interview dated Apr. 7, 2016", 20 pgs.
"U.S. Appl. No. 14/572,203, Non Final Office Action dated Dec. 30, 2016", 12 pgs.
"U.S. Appl. No. 14/572,203, Notice of Allowance dated Apr. 21, 2017", 12 pgs.
"U.S. Appl. No. 14/572,203, Response filed Mar. 3, 2017 to Non Final Office Action dated Dec. 30, 2016", 10 pgs.
"U.S. Appl. No. 14/572,203, Response filed Dec. 5, 2016 to Final Office Action dated Sep. 13, 2016", 11 pgs.
"U.S. Appl. No. 14/572,203, Response filed Jun. 7, 2016 to First Action Interview dated Apr. 7, 2016", 16 pgs.
"U.S. Appl. No. 14/601,807, First Action Interview—Office Action Summary dated Mar. 6, 2017", 3 pgs.
"U.S. Appl. No. 14/601,807, First Action Interview—Pre-Interview Communication dated Nov. 1, 2016", 4 pgs.
"U.S. Appl. No. 14/601,807, Notice of Allowance dated Jun. 7, 2017", 5 pgs.
"U.S. Appl. No. 14/601,807, Response filed Apr. 14, 2017 to Non Final Office Action dated Mar. 6, 2017", 9 pgs.
"U.S. Appl. No. 14/601,807, Response filed Dec. 15, 2016 to First Action Interview—Pre-Interview Communication dated Nov. 1, 2016", 9 pgs.
"U.S. Appl. No. 14/662,704, First Action Interview—Pre-Interview Communication dated Aug. 25, 2016", 5 pgs.
"U.S. Appl. No. 14/662,704, Non Final Office Action dated Jan. 27, 2017", 15 pgs.
"U.S. Appl. No. 14/849,291, Examiner Interview Summary dated Nov. 20, 2017", 3 pgs.
"U.S. Appl. No. 14/849,291, Final Office Action dated Oct. 6, 2017", 12 pgs.
"U.S. Appl. No. 14/849,291, Final Office Action dated Oct. 22, 2018", 15 pgs.
"U.S. Appl. No. 14/849,291, Non Final Office Action dated Feb. 12, 2016", 9 pgs.
"U.S. Appl. No. 14/849,291, Non Final Office Action dated Mar. 22, 2019", 15 pgs.
"U.S. Appl. No. 14/849,291, Non Final Office Action dated Apr. 20, 2018", 14 pgs.
"U.S. Appl. No. 14/849,291, Non Final Office Action dated Dec. 30, 2016", 9 pgs.
"U.S. Appl. No. 14/849,291, Response filed Jan. 22, 2019 to Final Office Action dated Oct. 22, 2018", 12 pqs.
"U.S. Appl. No. 14/849,291, Response filed Mar. 6, 2018 to Final Office Action dated Oct. 6, 2017", 11 pgs.
"U.S. Appl. No. 14/849,291, Response filed May 10, 2016 to Non Final Office Action dated Feb. 12, 2016", 14 pgs.
"U.S. Appl. No. 14/849,291, Response filed Sep. 20, 2018 to Non Final Office Actio dated Apr. 20, 2018", 11 pgs.
"U.S. Appl. No. 14/849,291, Response filed May 30, 2017 to Non Final Office Action dated Dec. 30, 2016", 11 pgs.
"U.S. Appl. No. 14/849,341, Final Office Action dated Mar. 7, 2018", 15 pgs.
"U.S. Appl. No. 14/849,341, Final Office Action dated Apr. 19, 2019", 12 pgs.
"U.S. Appl. No. 14/849,341, Non Final Office Action dated Jul. 6, 2017", 14 pgs.
"U.S. Appl. No. 14/849,341, Non Final Office Action dated Sep. 11, 2018", 12 pgs.
"U.S. Appl. No. 14/849,341, Response filed Dec. 6, 2017 to Non Final Office Action dated Jul. 6, 2017", 11 pgs.
"U.S. Appl. No. 14/849,341, Response Filed Aug. 7, 2018 to Final Office Action dated Mar. 7, 2018", 12 pgs.
"U.S. Appl. No. 14/849,354 Notice of Non-Compliant Amendment dated Apr. 25, 2018", 3 pgs.
"U.S. Appl. No. 14/849,354 Response Filed Jun. 25, 2018 to Notice of Non-Compliant Amendment dated Apr. 25, 2018", 8 pgs.
"U.S. Appl. No. 14/849,354, Final Office Action dated Apr. 29, 2019", 10 pgs.
"U.S. Appl. No. 14/849,354, Non Final Office Action dated Sep. 21, 2018", 10 pgs.
"U.S. Appl. No. 14/849,354, Response filed Feb. 20, 2018 to Restriction Requirement dated Oct. 19, 2017", 8 pgs.
"U.S. Appl. No. 14/849,354, Response filed Feb. 21, 2019 to Non Final Office Action dated Sep. 21, 2018", 11 pgs.
"U.S. Appl. No. 14/849,354, Response filed May 14, 2019 to Final Office Action maled Apr. 29, 2019", 12 pgs.
"U.S. Appl. No. 14/849,354, Restriction Requirement dated Oct. 19, 2017", 6 pgs.
"U.S. Appl. No. 14/876,208, Examiner Interview Summary dated Aug. 16, 2018", 3 pgs.
"U.S. Appl. No. 14/876,208, Final Office Action dated Jun. 29, 2017", 7 pgs.
"U.S. Appl. No. 14/876,208, Final Office Action dated Jun. 29, 2018", 13 pgs.
"U.S. Appl. No. 14/876,208, Non Final Office Action dated Feb. 27, 2017", 7 pgs.
"U.S. Appl. No. 14/876,208, Non Final Office Action dated Nov. 29, 2018", 20 pgs.
"U.S. Appl. No. 14/876,208, Non Final Office Action dated Dec. 20, 2017", 9 pgs.
"U.S. Appl. No. 14/876,208, Notice of Allowance dated Apr. 11, 2019", 13 pgs.
"U.S. Appl. No. 14/876,208, Response filed Feb. 27, 2019 to Non Final Office Action dated Nov. 29, 2018", 12 pgs.
"U.S. Appl. No. 14/876,208, Response filed May 26, 2017 to Non Final Office Action dated Feb. 27, 2017", 9 pgs.
"U.S. Appl. No. 14/876,208, Response filed Oct. 29, 2018 to Final Office Action dated Jun. 29, 2018", 11 pgs.
"U.S. Appl. No. 14/876,208, Response filed Oct. 30, 2017 to Final Office Action dated Jun. 29, 2017", 12 pgs.
"U.S. Appl. No. 15/593,807, Examiner Interview Summary dated Jul. 3, 2018", 2 pgs.
"U.S. Appl. No. 15/593,807, Final Office Action dated Dec. 11, 2018", 6 pgs.

(56) References Cited

OTHER PUBLICATIONS

"U.S. Appl. No. 15/593,807, First Action Interview—Office Action Summary dated Jul. 10, 2018", 3 pgs.
"U.S. Appl. No. 15/593,807, First Action Interview—Pre-Interview Communication dated Mar. 16, 2018", 4 pgs.
"U.S. Appl. No. 15/593,807, Notice of Allowance dated Feb. 26, 2019", 5 pgs.
"U.S. Appl. No. 15/593,807, Response filed Feb. 8, 2019 to Final Office Action dated Dec. 11, 2018", 11 pgs.
"U.S. Appl. No. 15/593,807, Response filed Sep. 10, 2018 to First Action Interview dated Jul. 10, 2018", 11 pgs.
"U.S. Appl. No. 15/594,016, First Action Interview—Pre-Interview Communication dated Aug. 8, 2017", 4 pgs.
"U.S. Appl. No. 15/594,016, Non Final Office Action dated Feb. 6, 2018", 6 pgs.
"U.S. Appl. No. 15/594,016, Notice of Allowance dated Jun. 15, 2018", 8 pgs.
"U.S. Appl. No. 15/594,016, Preliminary Amendment filed May 15, 2017", 9 pgs.
"U.S. Appl. No. 15/594,016, Response filed Mar. 6, 2018 to Non Final Office Action dated Feb. 6, 2018", 11 pgs.
"U.S. Appl. No. 15/646,953, Final Office Action dated Nov. 19, 2018", 22 pgs.
"U.S. Appl. No. 15/646,953, Non Final Office Action dated Jan. 26, 2018", 13 pgs.
"U.S. Appl. No. 15/646,953, Preliminary Amendment filed Jul. 12, 2017", 8 pgs.
"U.S. Appl. No. 15/646,953, Response filed Jun. 26, 2018 to Non Final Office Action dated Jan. 26, 2018", 14 pgs.
"U.S. Appl. No. 15/652,800, Corrected Notice of Allowability dated Mar. 28, 2019", 2 pgs.
"U.S. Appl. No. 15/652,800, Corrected Notice of Allowability dated May 13, 2019", 3 pgs.
"U.S. Appl. No. 15/652,800, Examiner Interview Summary dated Jul. 3, 2018", 2 pgs.
"U.S. Appl. No. 15/652,800, First Action Interview—Office Action Summary dated Jul. 13, 2018", 3 pgs.
"U.S. Appl. No. 15/652,800, First Action Interview—Pre-Interview Communication dated Apr. 10, 2018", 4 pgs.
"U.S. Appl. No. 15/652,800, Notice of Allowance dated Dec. 28, 2018", 6 pgs.
"U.S. Appl. No. 15/652,800, Response filed Nov. 13, 2018 to First Action Interview Office Action Summary dated Jul. 13, 2018", 14 pgs.
"U.S. Appl. No. 15/593,807, Preliminary Amendment filed May 15, 2017", 8 pgs.

U.S. Appl. No. 16/454,529, filed Jun. 27, 2019, Determining Hardness Quotients For Level Definition Files Based on Player Skill Level.
U.S. Appl. No. 16/742,609, filed Jan. 14, 2020, Adjusting Object Adaptive Modification or Game Level Difficulty and Physical Gestures Through Level Definition Files.
U.S. Appl. No. 16/738,474, filed Jan. 9, 2020, Automated Game Modification Based on Playing Style.
U.S. Appl. No. 16/569,255, filed Sep. 12, 2019, Methods and Systems For Adaptive Tuning of Game Events.
"U.S. Appl. No. 14/849,354, Notice of Allowance dated Jun. 12, 2019", 7 pages.
"U.S. Appl. No. 14/569,534, Amendment under 37 C.F.R. 1312 filed Jun. 26, 2019", 3 pages.
"U.S. Appl. No. 14/849,341, Response filed Sep. 19, 2019 to Final Office Action dated Apr. 19, 2019", 10 pages.
"U.S. Appl. No. 14/849,291, Response filed Sep. 23, 2019 to Non-Final Office Action dated Mar. 22, 2019", 12 pages.
"U.S. Appl. No. 14/849,341, Notice of Allowance dated Oct. 2, 2019", 9 pages.
"U.S. Appl. No. 14/849,291, Notice of Allowance dated Oct. 9, 2019", 14 pages.
"U.S. Appl. No. 14/849,341, Corrected Notice of Allowability dated Jan. 14, 2020", 2 pages.
"U.S. Appl. No. 16/371,967, Non Final Office Action dated Apr. 9, 2020", 10 pages.
"U.S. Appl. No. 16/454,529, Preliminary Amendment filed Jun. 22, 2020", 8 pages.
"U.S. Appl. No. 16/738,474, Preliminary Amendment filed Jul. 6, 2020", 8 pages.
"U.S. Appl. No. 16/742,609, Preliminary Amendment filed Jul. 6, 2020", 8 pages.
"U.S. Appl. No. 16/371,967, Response filed Jul. 9, 2020 to Non Final Office Action dated Apr. 9, 2020", 16 pages.
"U.S. Appl. No. 16/371,967, Ex Parte Quayle Action mailed Jul. 29, 2020", 4 pages.
"U.S. Appl. No. 16/371,967, Response filed Sep. 29, 2020 to Ex Parte Quayle Action mailed Jul. 29, 2020", 13 pages.
"U.S. Appl. No. 16/742,609, Non Final Office Action dated Oct. 7, 2020", 9 pages.
"U.S. Appl. No. 16/454,529, Notice of Allowance dated Oct. 9, 2020", 15 pages.
"U.S. Appl. No. 16/371,967, Notice of Allowance dated Nov. 6, 2020", 5 pages.
"U.S. Appl. No. 16/742,609, Response filed Mar. 8, 2021 to Non Final Office Action dated Oct. 7, 2020", 9 pgs.

* cited by examiner

SYSTEMS AND METHODS FOR DETERMINING GAME LEVEL ATTRIBUTES BASED ON PLAYER SKILL LEVEL PRIOR TO GAME PLAY IN THE LEVEL

CROSS-REFERENCE TO RELATED APPLICATIONS

This application is a continuation of U.S. patent application Ser. No. 15/593,807, filed on May 12, 2017, which is a continuation of U.S. patent application Ser. No. 14/546,865, filed on Nov. 18, 2014, which claims the benefit of priority to U.S. Provisional Patent Application Ser. No. 62/048,362, filed on Sep. 10, 2014, which applications are incorporated herein by reference in their entirety.

TECHNICAL FIELD

The present disclosure generally relates to games and applications in general and, in particular embodiments, to customizing user experiences.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, etc. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social networking system. Such an online social networking system allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

DETAILED DESCRIPTION

Figure 1:
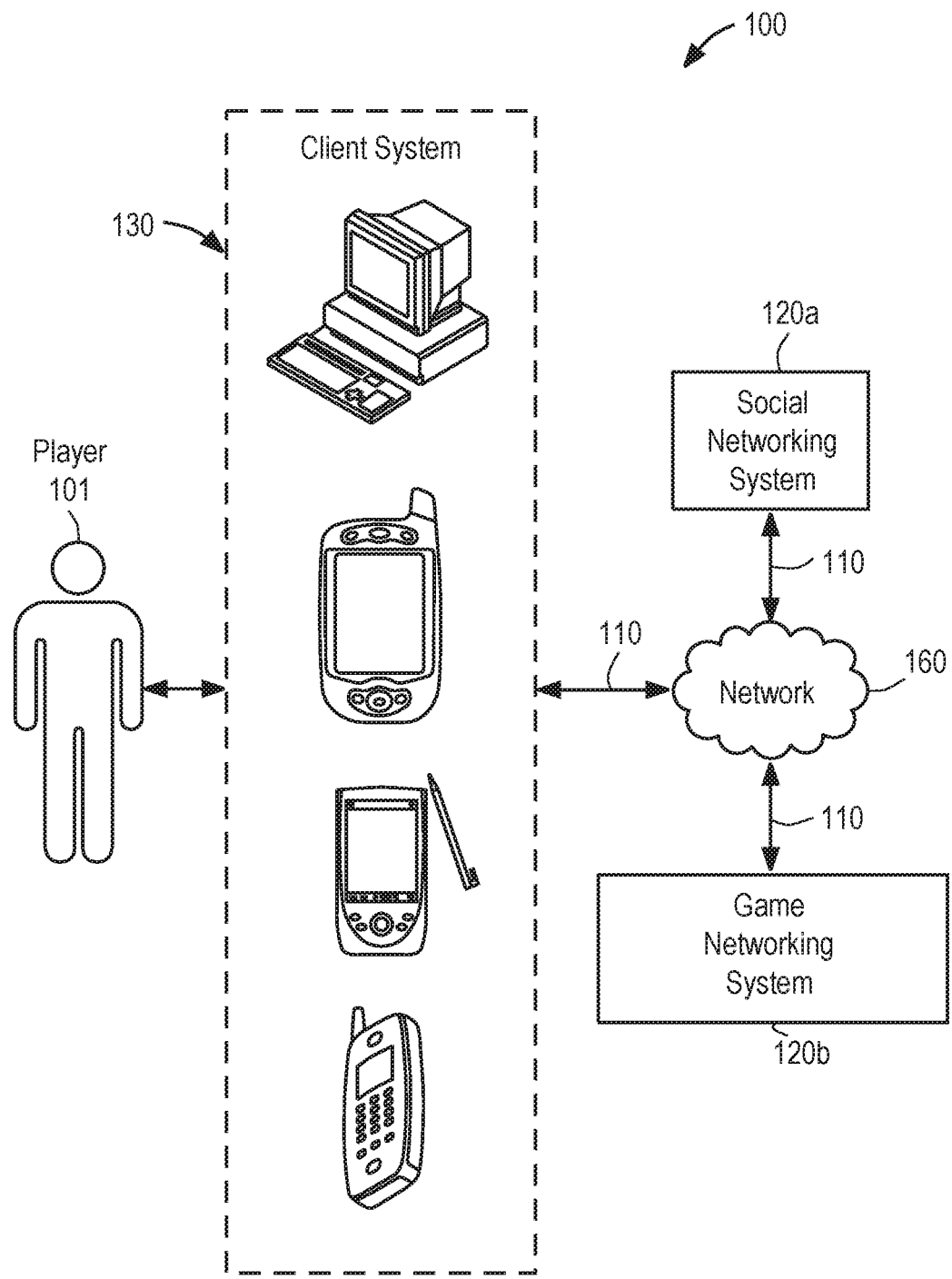
FIG. 1 is a schematic diagram showing an example of a system, according to some example embodiments.

A system, a machine-readable storage medium storing instructions, and a computer-implemented method are described herein to determine a player skill level of a player based at least on the player's performance in a first level and to modify an attribute(s) of a second level of a game based at least one the player skill level. In the following description, for purposes of explanation, numerous specific details are set forth in order to provide a thorough understanding of example embodiments. It will be evident, however, to one skilled in the art that the present technology may be practiced without these specific details.

A System Tuner calculates a reference rate of progression for each of a plurality of game levels of a game. The reference rate of progression for a particular game level is based at least on game moves of a plurality of players in that particular game level. The reference rate of progression rate of progression represents an optimal player experience in the particular game level.

The System Tuner calculates a player skill level for a player based at least on a plurality of game moves in a first game level completed by the player. The System Tuner modifies at least one attribute of a second game level based on the player skill level prior to game play of the player in the second game level. The System Tuner detects game play of the player in the second game level. The System Tuner identifies a difference between a current rate of progression of the player through the second game level and a reference rate of progression for the second game level. The System Tuner triggers the modified attribute of the second game according to an extent of the difference between the current rate of progression and the reference rate of progression. By triggering the modified attribute, the System Tuner manipulates a level of difficulty experienced by the player in the second game level in order to assure that the player progresses through the second game level according to the reference rate of progression.

In various embodiments, the System Tuner monitors activities of a player within a game in order to continuously calculate and update a skill level for each player ("player skill level" or "PSL") as the player progresses between levels of the game. In some embodiments, a game level allows the player a finite number of game moves in order to complete the game level. In other embodiments, a game move can be an action performed by the player. While the player is playing the game level, the System Tuner compares the player's progress in the game level against a reference rate of progress for the game level.

The reference rate of progress is continuously calculated and updated by the System Tuner and is based on game-related data that describes the game performance of a plurality of players. The reference rate of progress represents an ideal rate of progression for any player towards the end of the game level and/or towards an in-level purchase decision (such as an in-level transaction offer). As the System Tuner detects that the player's progression in the game level is better than the reference rate of progress, the System Tuner triggers features and attributes of the game level that increase the difficulty of the game level. As the System Tuner detects that the player's progression in the game level is worse than the reference rate of progress, the System Tuner triggers features and attributes of the game level that decrease the difficulty of the game level.

The game level attributes and features the System Tuner can trigger are determined according to the player's PSL before the player initiates game play in the game level. Upon detecting completion of a game level by the player, the System Tuner updates the player's PSL based on the player's performance in the recently-completed game level and utilizes the updated PSL to determine attributes and features of the next game level the player will play.

In a game in which the player must select letters in order to form words, the player is assigned a tile bag prior to entering into a game level. A tile bag represents all the possible letters that can be made available to the player as the player submits game moves in the level. The System Tuner adjusts the letter composition of the tile bag for a particular game level according to the PSL before the player begins game play in the particular game level. If the player's PSL is high, meaning that the player is a highly-skilled player, the System Tuner will utilize the high PSL to generate a letter composition of the tile bag that includes more consonants than vowels. If the player's PSL is low, meaning that the player is a low-skilled player, the System Tuner will utilize the low PSL to generate a letter composition of the tile bag that includes more vowels than consonants. It is understood that, in various embodiments, the System Tuner utilizes the PSL to determine a letter composition of a tile bag beyond merely determining the number of consonants and the number of vowels. The System Tuner can utilize the PSL to determine a particular amount of a type of letter (such as "X" or "Z") to be included in the tile bag.

The System Tuner also utilizes the PSL to determine other attributes and features of a particular game level before the player begins game play in the particular game level. In various embodiments, the System Tuner determines aspects of in-level features, such as a length of a meter that measures the player's progress towards receiving a bonus reward. For example, the System Tuner generates a longer meter for players with high PSLs and a shorter meter of players with low PSLs. The System Tuner can also determine a drop rate (or a drop rate range) for letters based on the PSL. For example, the System Tuner determines a drop rate that defines how often a particular type of letter(s) will appear as being available for selection by the player as the player selects letters during game play in the level. In another example, a drop rate can define how often a particular type of in-level game obstacle is presented to the player.

In various embodiments, a PSL for each respective player of the game is calculated by the System Tuner based on how the player's in-game performance compares against a reference performance measurement. The calculation of the PSL by the System Tuner can be based on various attributes of the player's in-game actions, decisions, and/or performance in the game (or in one or more game levels). In some embodiments, the PSL is based at least on an extent of a difference between a player's actual number of attempts at achieving a goal defined in a previous level and a reference number of attempts for the goal. For example, the player's PSL can be increased by the System Tuner if the player's number of actual attempts to progress through a particular game level is less than a reference number of expected attempts for that particular game level. In another example, the player's PSL can be decreased by the System Tuner if the player's number of actual attempts to progress through the particular game level is more than the reference number of expected attempts for that particular game level. In some embodiments, the PSL is based at least on an extent of a difference between a player's pattern of use of virtual objects that provide bonus points and a reference pattern of use of bonus virtual objects.

The PSL can be increased or decreased by the System Tuner due at least to an extent of a difference between an actual amount of the player's game play time and a reference amount of game play time. The PSL can be increased or decreased by the System Tuner due at least to an extent of a difference between an actual number of game points earned by the player and a reference number of game points. The PSL can be increased or decreased by the System Tuner due at least to an extent of a difference between a frequency of patterns of virtual objects selected by a player and a reference frequency of patterns of selected virtual objects. For example, the player's PSL can be based at least on a difference between an average length of words selected by the player and a reference average length of words.

In various embodiments in a game, where a game move requires the identification of a sequence or grouping of matching virtual objects in order to eliminate the matching virtual objects, the game may provide additional objects that assist in the identification and collection of the matching virtual objects. For example, the game may provide an additional object (e.g. a barrel) into which a particular type of virtual object can be dragged and dropped. Once the drag and drop action is complete, all other matching instances of that particular type of virtual object will be eliminated from the current state of the game. The System Tuner can modify how often the additional object (e.g. the barrel) appears in the game based at least on the PSL. In addition, an opportunity for a transaction to purchase the additional object can be based at least on the PSL.

Also, the System Tuner can modify how often an opportunity for a transaction to purchase bundles of packages of real or virtual goods occurs based at least on the PSL. The types of real or virtual goods offered in the transaction can also be based at least on the PSL. In other embodiments, an additional object provided by the System Tuner based on the PSL can assist on elimination of various type of virtual objects, such as the elimination of matching instances of a type of virtual objects, elimination of a column (or row) of non-matching virtual objects, elimination of a particular number of non-matching (or matching) virtual objects.

As the player progresses through the second game level, the System Tuner calculates a current rate of progression through the second game level of the player. The System Tuner compares the player's current rate of progression to the reference rate of progression for the second game level. The System Tuner determines an extent of a difference between the current rate of progression and a reference rate of progression.

If the player's current rate of progression is higher than the reference rate of progression, the System Tuner triggers modified attributes of the second game level that will slow the player's progression through the second game level such that the current rate of progression becomes aligned with the reference rate of progression. Such modified attributes to slow the player's progression include, for example, in-level hazards and game moves that require a level of player skill above the player's PSL.

If the player's current rate of progression is lower than the reference rate of progression, the System Tuner triggers modified attributes of the second game level that will assist the player's progression through the second game level such that the current rate of progression becomes aligned with the reference rate of progression. Such modified attributes to slow the player's progression include, for example, in-level bonus moves and game moves that require a level of player skill below the player's PSL.

It is understood that various embodiments include the generation of one or more modules that comprise source code that, when compiled by a computing device(s), creates object code that causes the computing device(s) to perform one or more operations described herein. In other embodiments, any of the modules comprise object code that causes the computing device(s) to perform various operations described herein.

Other embodiments include the generation of one or more modules that comprise source code that, when compiled by a client computing device(s), creates object code that causes the client computing device(s) to perform one or more operations described herein in communication with a server computing devices(s). In other embodiments, any of the modules comprise object code that causes the client computing device(s) to perform various operations described herein in communication with the server computing devices(s).

Other embodiments include the generation of one or more modules that comprise source code that, when compiled by a server computing device(s), creates object code that causes the server computing device(s) to perform one or more operations described herein in communication with one or more client computing devices. In other embodiments, any of the modules comprise object code that causes the server computing device(s) to perform various operations described herein in communication with the one or more client computing devices.

Social Network Systems and Game Networking Systems

FIG. 1 illustrates an example of a system for implementing various disclosed embodiments. In particular embodiments, system 100 comprises player 101, social networking system 120*a*, game networking system 120*b* (i.e. online gaming system), client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120*a* (i.e. social network system) is a network-addressable computing system that can host one or more social graphs. Social networking system 120*a* can generate, store, receive, and transmit social networking data. Social networking system 120*a* can be accessed by the other components of system 100 either directly or via network 160. Game networking system 120*b* is a network-addressable computing system that can host one or more online games. Game networking system 120*b* can generate, store, receive, and transmit game-related data, such as, for example, game account data, game input, game state data, and game displays. Game networking system 120*b* can be accessed by the other components of system 100 either directly or via network 160. Player 101 may use client system 130 to access, send data to, and receive data from social networking system 120*a* and game networking system 120*b*. Client system 130 can access social networking system 120*a* or game networking system 120*b* directly, via network 160, or via a third-party system. As an example and not by way of limitation, client system 130 may access game networking system 120*b* via social networking system 120*a*. Client system 130 can be any suitable computing device, such as a personal computer, laptop, cellular phone, smart phone, computing tablet, etc.

Although FIG. 1 illustrates a particular number of players 101, social network systems 120*a*, game networking systems 120*b*, client systems 130, and networks 160, this disclosure contemplates any suitable number of players 101, social network systems 120*a*, game networking systems 120*b*, client systems 130, and networks 160. As an example and not by way of limitation, system 100 may include one or more game networking systems 120*b* and no social networking systems 120*a*. As another example and not by way of limitation, system 100 may include a system that comprises both social networking system 120*a* and game networking system 120*b*. Moreover, although FIG. 1 illustrates a particular arrangement of player 101, social networking system 120*a*, game networking system 120*b*, client system 130, and network 160, this disclosure contemplates any suitable arrangement of player 101, social networking system 120*a*, game networking system 120*b*, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120a, game networking system 120b, client system 130, and network 160, this disclosure contemplates any suitable connections between player 101, social networking system 120a, game networking system 120b, client system 130, and network 160. As an example and not by way of limitation, in particular embodiments, client system 130 may have a direct connection to social networking system 120a or game networking system 120b, bypassing network 160.

Online Games and Game Systems

Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120b (i.e. online gaming system), which includes a Notification Generator 150 that performs operations according to embodiments as described herein. The game networking system 120b can be accessed using any suitable connection with a suitable client system 130. A player may have a game account on game networking system 120b, wherein the game account can contain a variety of information associated with the player (e.g., the player's personal information, financial information, purchase history, player character state, game state). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as, for example, client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120b.

Storing Game-Related Data

A database may store any data relating to game play within a game networking system 120b. The database may include database tables for storing a player game state that may include information about the player's virtual gameboard, the player's character, or other game-related information. For example, player game state may include virtual objects owned or used by the player, placement positions for virtual structural objects in the player's virtual gameboard, and the like. Player game state may also include in-game obstacles of tasks for the player (e.g., new obstacles, current obstacles, completed obstacles, etc.), the player's character attributes (e.g., character health, character energy, amount of coins, amount of cash or virtual currency, etc.), and the like.

The database may also include database tables for storing a player profile that may include user-provided player information that is gathered from the player, the player's client device, or an affiliate social network. The user-provided player information may include the player's demographic information, the player's location information (e.g., a historical record of the player's location during game play as determined via a GPS-enabled device or the internet protocol (IP) address for the player's client device), the player's localization information (e.g., a list of languages chosen by the player), the types of games played by the player, and the like.

In some example embodiments, the player profile may also include derived player information that may be determined from other information stored in the database. The derived player information may include information that indicates the player's level of engagement with the virtual game, the player's friend preferences, the player's reputation, the player's pattern of game-play, and the like. For example, the game networking system 120b may determine the player's friend preferences based on player attributes that the player's first-degree friends have in common, and may store these player attributes as friend preferences in the player profile. Furthermore, the game networking system 120b may determine reputation-related information for the player based on user-generated content (UGC) from the player or the player's $N^{th}$ degree friends (e.g., in-game messages or social network messages), and may store this reputation-related information in the player profile. The derived player information may also include information that indicates the player's character temperament during game play, anthropological measures for the player (e.g., tendency to like violent games), and the like.

In some example embodiments, the player's level of engagement may be indicated from the player's performance within the virtual game. For example, the player's level of engagement may be determined based on one or more of the following: a play frequency for the virtual game or for a collection of virtual games; an interaction frequency with other players of the virtual game; a response time for responding to in-game actions from other players of the virtual game; and the like.

In some example embodiments, the player's level of engagement may include a likelihood value indicating a likelihood that the player may perform a desired action. For example, the player's level of engagement may indicate a likelihood that the player may choose a particular environment, or may complete a new challenge within a determinable period of time from when it is first presented to him.

In some example embodiments, the player's level of engagement may include a likelihood that the player may be a leading player of the virtual game (a likelihood to lead). The game networking system 120*b* may determine the player's likelihood to lead value based on information from other players that interact with this player. For example, the game networking system 120*b* may determine the player's likelihood to lead value by measuring the other players' satisfaction in the virtual game, measuring their satisfaction from their interaction with the player, measuring the gameplay frequency for the other players in relation to their interaction frequency with the player (e.g., the ability for the player to retain others), and/or the like.

The game networking system 120*b* may also determine the player's likelihood to lead value based on information about the player's interactions with others and the outcome of these interactions. For example, the game networking system 120*b* may determine the player's likelihood to lead value by measuring the player's amount of interaction with other players (e.g., as measured by a number of challenges that the player cooperates with others, and/or an elapsed time duration related thereto), the player's amount of communication with other players, the tone of the communication sent or received by the player, and/or the like. Moreover, the game networking system 120*b* may determine the player's likelihood to lead value based on determining a likelihood for the other players to perform a certain action in response to interacting or communicating with the player and/or the player's virtual environment.

Game Systems, Social Networks, and Social Graphs:

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 120a or game networking system 120b). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
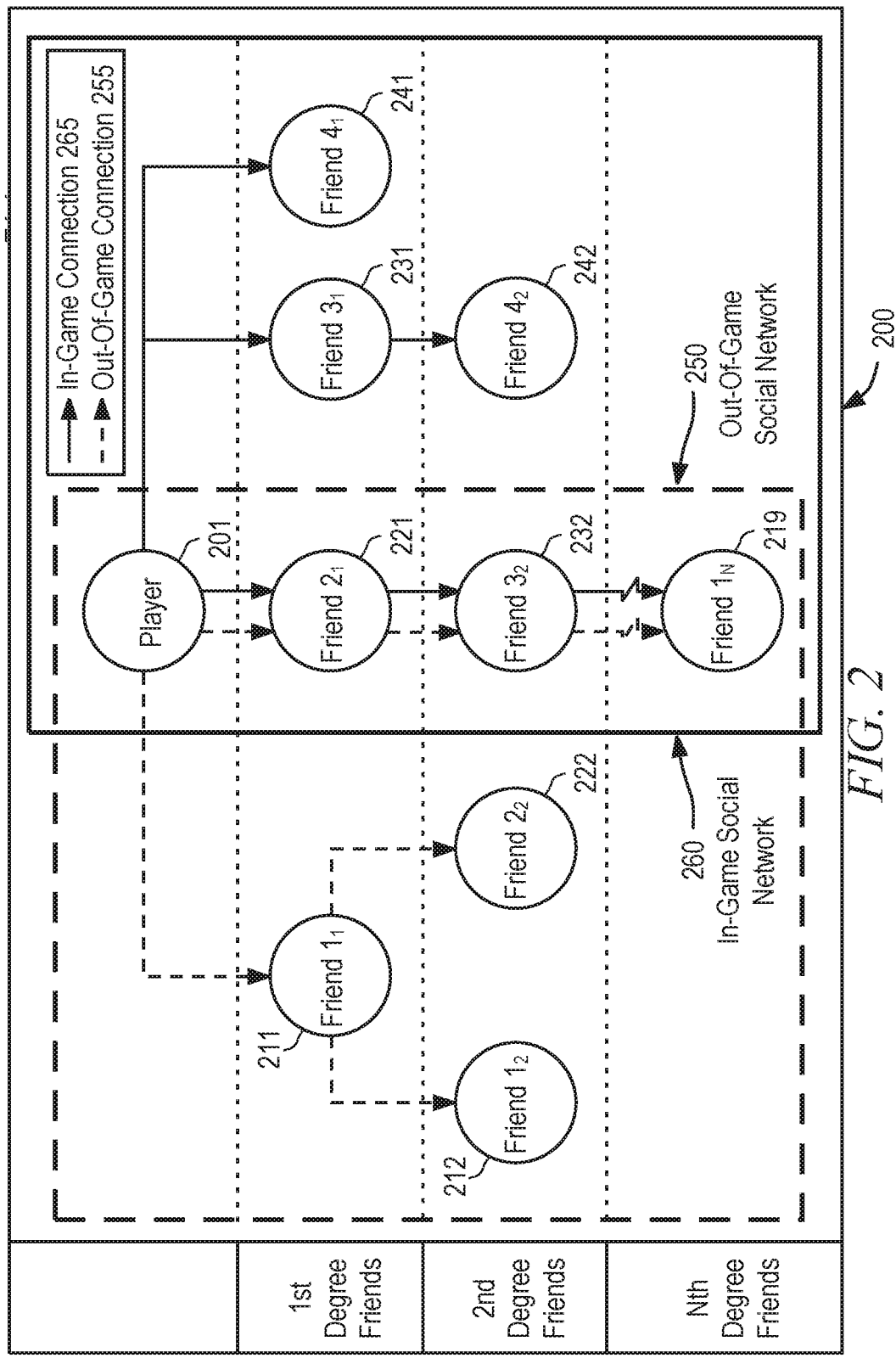
FIG. 2 is a schematic diagram showing an example of a social network within a social graph, according to some embodiments.

FIG. 2 shows an example of a social network within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player," "user" and "account" can be used interchangeably and can refer to any user or character in an online game networking system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Figure 3:
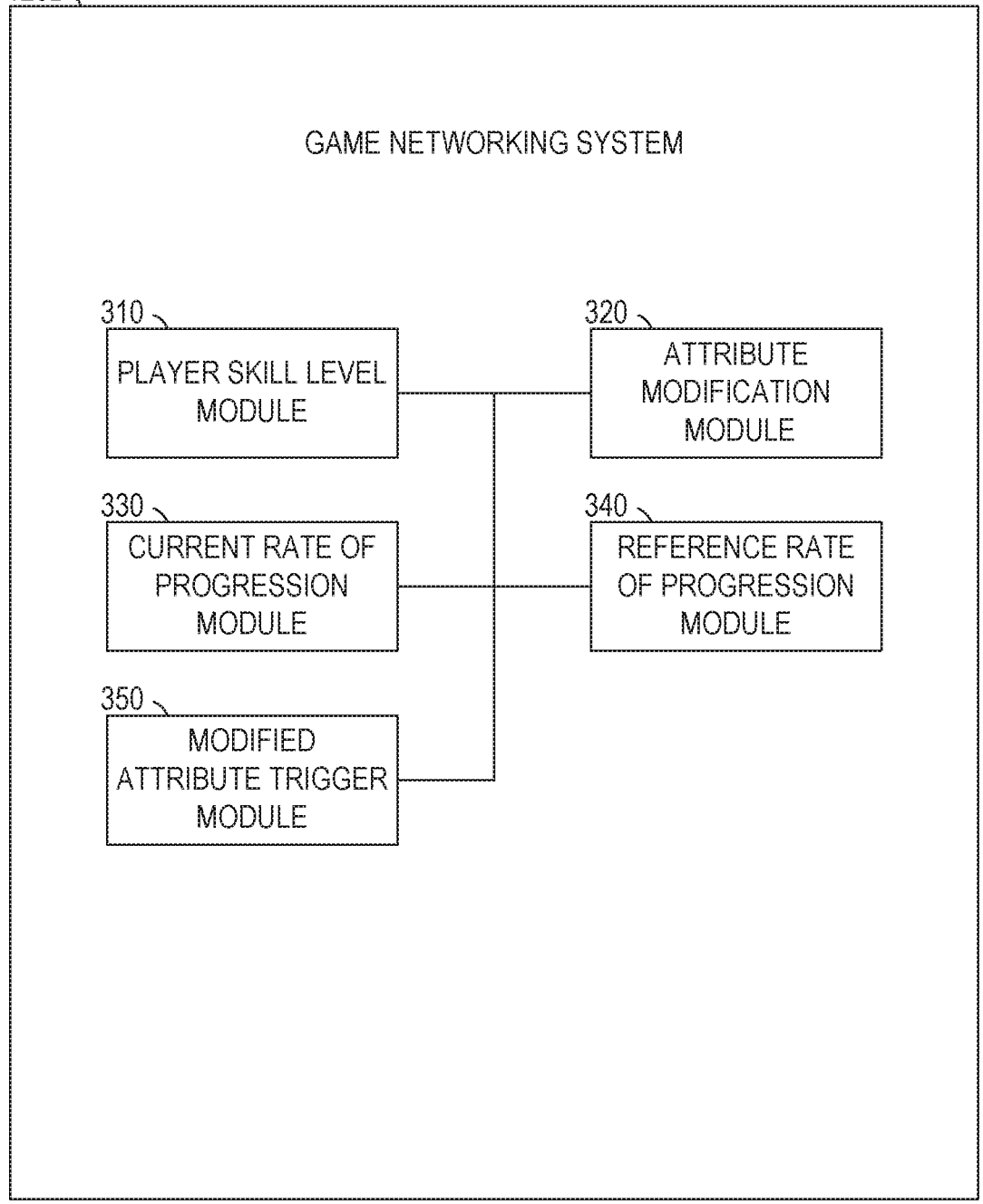
FIG. 3 is a block diagram illustrating components of a computing device, according to some example embodiments.

FIG. 3 is a block diagram illustrating components of a game networking system, according to some example embodiments. The game networking system 120b includes a player skill level module 310, an attribute modification module 320, a current rate of progression module 330, a reference rate of progression module 340 and a modified attribute trigger module 350.

In various example embodiments, the player skill level module 310, is a hardware-implemented module that controls, manages and stores information related to calculating and updating a respective player skill level for one or more players.

In various example embodiments, the attribute modification module 320 is a hardware-implemented module that controls, manages and stores information related to modifying and updating one or more features and one or more attributes of a game level(s) according to one or more player skill levels.

In various example embodiments, the current rate of progression module 330 is a hardware-implemented module that controls, manages and stores information related to calculating a particular player's rate of progression through a game level based on the various actions, decisions, game moves and earned points of the particular player.

In various example embodiments, the reference rate of progression module 340 is a hardware-implemented module that controls, manages and stores information related to related to calculating a range for an optimal rate of progression through a game level based on the various actions, decisions, game moves and earned points of a plurality of players.

In various example embodiments, the modified attribute trigger module 350 is a hardware-implemented module that controls, manages and stores information related to triggering use of a modified attribute in a game level based on an extent of a difference between a current rate of progression and a reference rate of progression.

The modules 310-350 are configured to communicate with each other (e.g., via a bus, shared memory, or a switch). Any one or more of the modules 310-350 described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
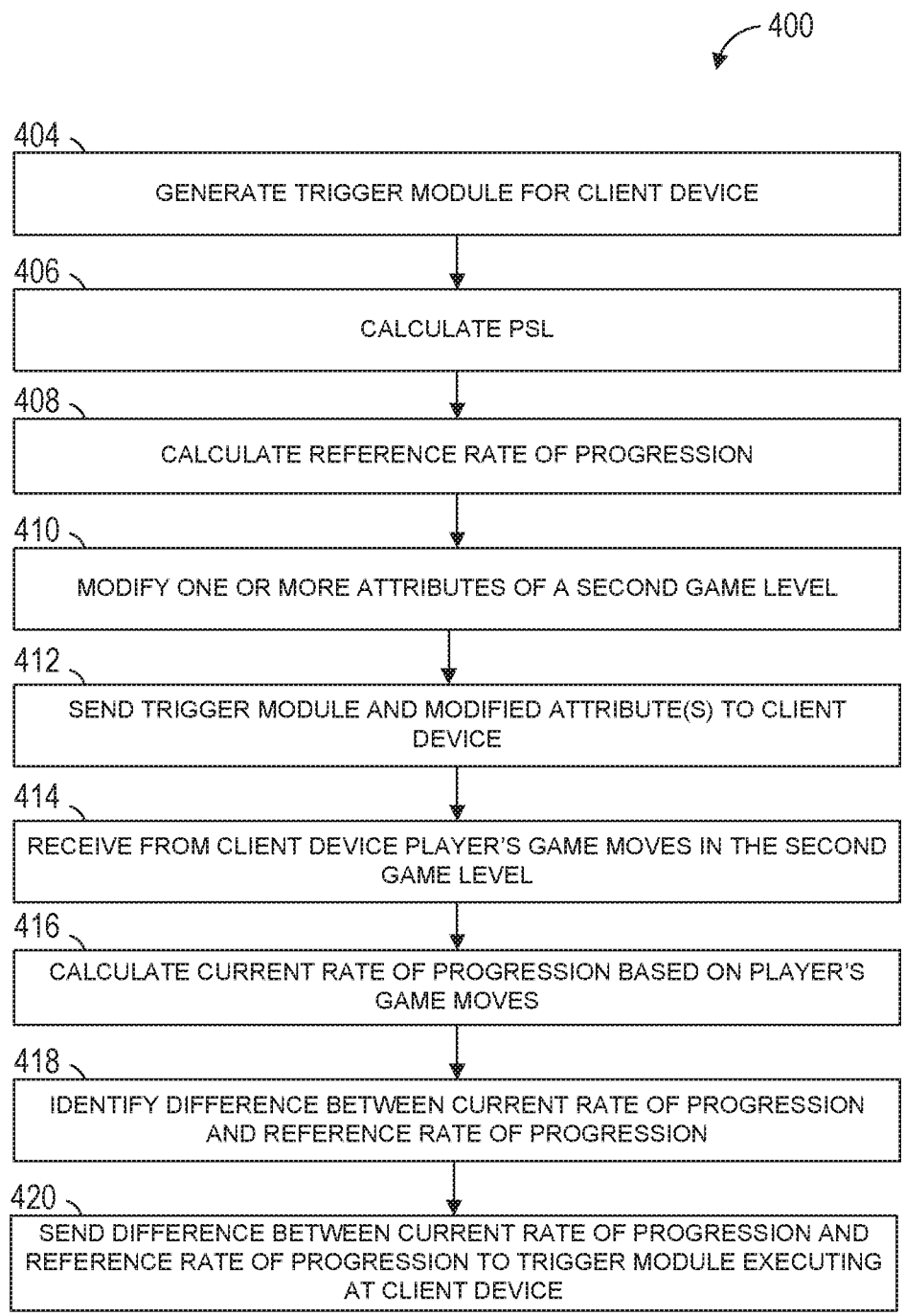
FIG. 4 is a flowchart showing an example method of triggering a modified attribute in a game level, according to some example embodiments.

FIG. 4 is a flowchart 400 showing an example method of triggering a modified attribute in a game level, according to some example embodiments. Flowchart 400 illustrates operations of a server-side System Tuner.

At operation 404, the System Tuner generates a trigger module to cause a client computing device to trigger use of a modified attribute of a second game level according to an extent of a difference between a current rate of progression and a reference rate of progression.

At operation 406, the System Tuner calculates a PSL for a first player based at least on a plurality of game moves in a first game level completed by the first player. The PSL indicates a skill level of the first player based on the first player's past performance in various levels of the game and/or various levels of a plurality of games.

At operation 408, the System Tuner calculates a reference rate of progression through the second game level based on a plurality of game moves in the second game level of a plurality of players. The System Tuner receives game-related data associated with the performance of each of a plurality of players who have previously played the second game. Based on the game-related data, the System Tuner calculates a range for a reference rate of progression which represents an ideal user experience in the second game level.

At operation 410, the System Tuner modifies one or more attributes of the second game level based on the PSL of the first player prior to game play of the first player in the second game level. The System Tuner receives an indication that the first player has completed the first game level. Prior to the first player entering the second game level, the System Tuner modifies one or more attributed and/or one or more features of the second game level according to the first player's PSL.

At operation 412, the System Tuner sends to the client computing device the trigger module and one or more modified attributes of the second game level. The System Tuner receives a request from the client computing device for the trigger module and the System Tuner sends the trigger module to the client computing device. The client computing device installs the trigger module as part of a game running on the client computing device. The System Tuner also sends to the client computing device the attribute/feature modifications the System Tuner made to the second game level based on the PSL.

At operation 414, the System Tuner receives from the client computing device data indicative of one or more game moves of the first player in the second game level.

At operation 416, the System Tuner calculates the current rate of progression through the second game level of the first player based at least on the data indicative of one or more game moves of the first player.

At operation 418, the System Tuner identifies a difference between the current rate of progression and the reference rate of progression.

At operation 420, the System Tuner sends to the trigger module executing on the client computing device the difference between the current rate of progression and the reference rate of progression. Based on the extent of the difference between the current rate of progression and the reference rate of progression, the trigger module determines which modified feature and/or modified attribute of the second game level to be used in order to cause the first player's current rate of progression to be within the range of the reference rate of progression.

Data Flow

Figure 5:
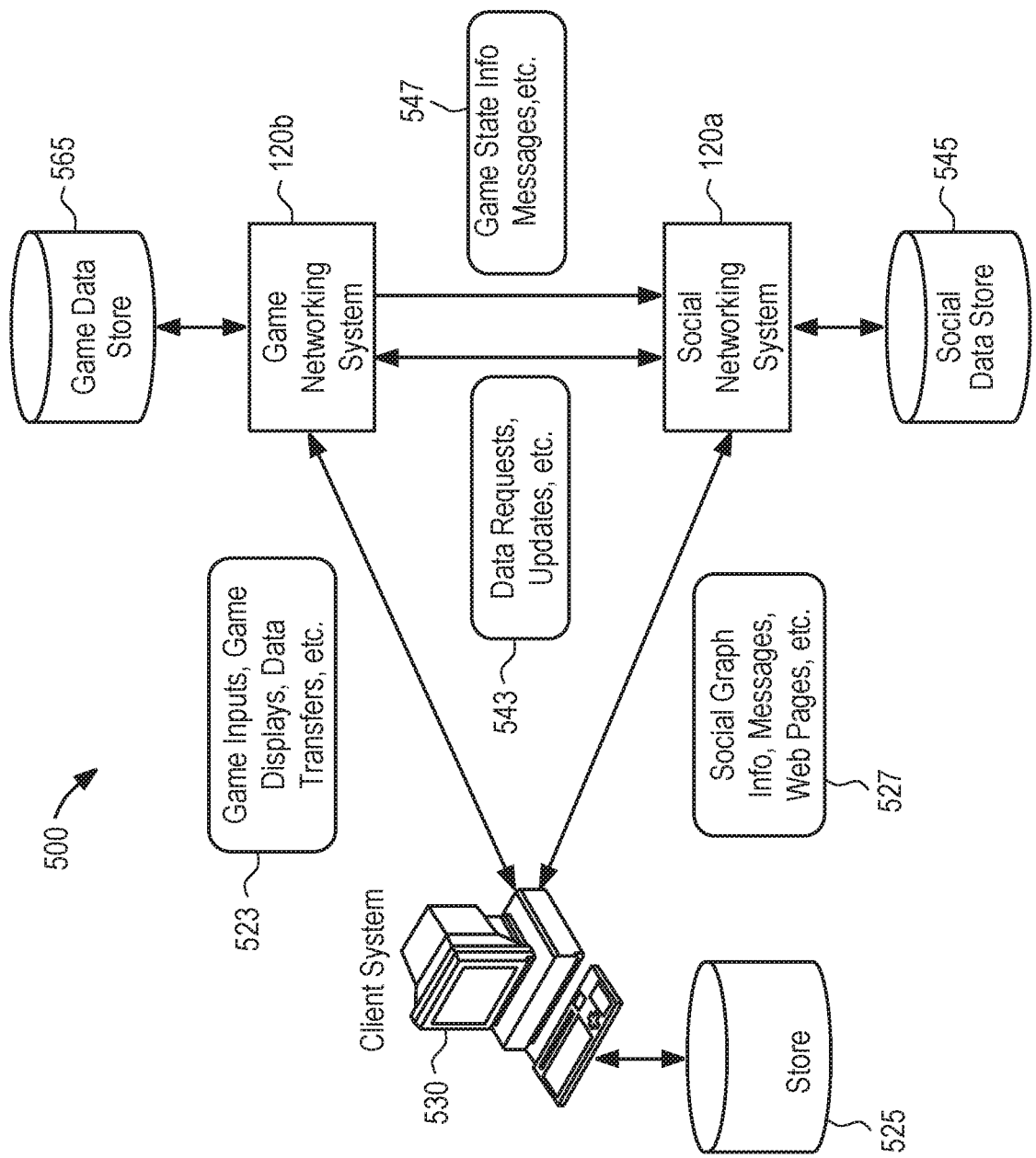
FIG. 5 is a diagrammatic representation of an example data flow between example components of the example system of FIG. 1, according to some example embodiments.

FIG. 5 illustrates an example data flow between the components of system 500. In particular embodiments, system 500 can include client system 530, social networking system 120*a* (i.e. social network system), and game networking system 120*b* (i.e. online game system system). The components of system 500 can be connected to each other in any suitable configuration, using any suitable type of connection. The components may be connected directly or over any suitable network. Client system 530, social networking system 120*a*, and game networking system 120*bb* can each have one or more corresponding data stores such as local data store 535, social data store 545, and game data store 565, respectively. Social networking system 120*a* and game networking system 120*b* can also have one or more servers that can communicate with client system 530 over an appropriate network. Social networking system 120*a* and game networking system 120*b* can have, for example, one or more internet servers for communicating with client system 530 via the Internet. Similarly, social networking system 120*a* and game networking system 120*b* can have one or more mobile servers for communicating with client system 530 via a mobile network (e.g., GSM, PCS, Wi-Fi, WPAN, etc.). In some embodiments, one server may be able to communicate with client system 530 over both the Internet and a mobile network. In other embodiments, separate servers can be used.

Client system 530 can receive and transmit data 523 to and from game networking system 120*b*. This data can include, for example, webpages, messages, game inputs, game displays, HTTP packets, data requests, transaction information, updates, and other suitable data. At some other time, or at the same time, game networking system 120*b* can communicate data 543, 547 (e.g., game state information, game system account information, page info, messages, data requests, updates, etc.) with other networking systems, such as social networking system 120*a* (e.g., Facebook, Myspace, etc.). Client system 530 can also receive and transmit data 527 to and from social networking system 120*a*. This data can include, for example, webpages, messages, social graph information, social network displays, HTTP packets, data requests, transaction information, updates, and other suitable data.

Communication between client system 530, social networking system 120*a*, and game networking system 120*b* can occur over any appropriate electronic communication medium or network using any suitable communications protocols. For example, client system 530, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTPS, FTP, SNMP, TELNET, and a number of other protocols, may be used. In some embodiments, no protocol may be used and, instead, transfer of raw data may be utilized via TCP or User Datagram Protocol. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 120*b*, the BLOB containing the game state for the instance corresponding to the player can be transmitted to client system 530 for use by a client-side executed object to process. In particular embodiments, the client-side executable may be a FLASH-based game, which can de-serialize the game state data in the BLOB. As a player plays the game, the game logic implemented at client system 530 maintains and modifies the various game state parameters locally. The client-side game logic may also batch game events, such as mouse clicks, and transmit these events to game networking system 120*b*. Game networking system 120*b* may itself operate by retrieving a copy of the BLOB from a database or an intermediate memory cache (memcache) layer. Game networking system 120*b* can also de-serialize the BLOB to resolve the game state parameters and execute its own game logic based on the events in the batch file of events transmitted by the client to synchronize the game state on the server side. Game networking system 120*b* may then re-serialize the game state, now modified, into a BLOB and pass this to a memory cache layer for lazy updates to a persistent database.

With a client-server environment in which the online games may run, one server system, such as game networking system 120*b*, may support multiple client systems 530. At any given time, there may be multiple players at multiple client systems 530 all playing the same online game. In practice, the number of players playing the same game at the same time may be very large. As the game progresses with each player, multiple players may provide different inputs to the online game at their respective client systems 530, and multiple client systems 530 may transmit multiple player inputs and/or game events to game networking system 120*b* for further processing. In addition, multiple client systems 530 may transmit other types of application data to game networking system 120*b*.

In particular embodiments, a computed-implemented game may be a text-based or turn-based game implemented as a series of web pages that are generated after a player selects one or more actions to perform. The web pages may be displayed in a browser client executed on client system 530. As an example and not by way of limitation, a client application downloaded to client system 530 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 120a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 530, either caused by an action of a game player or by the game logic itself, client system 530 may need to inform game networking system 120b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 500 is discussed in reference to updating a multi-player online game hosted on a network-addressable system (such as, for example, social networking system 120a or game networking system 120b), where an instance of the online game is executed remotely on a client system 530, which then transmits application event data to the hosting system such that the remote game server synchronizes game state associated with the instance executed by the client system 530.

In particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 530 may include a Flash client. The Flash client may be configured to receive and run Flash application or game object code from any suitable networking system (such as, for example, social networking system 120a or game networking system 120b). In particular embodiments, the Flash client may be run in a browser client executed on client system 530. A player can interact with Flash objects using client system 530 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 530, the Flash client may send the events that caused the game state changes to the in-game object to game networking system 120b. However, to expedite the processing and hence the speed of the overall gaming experience, the Flash client may collect a batch of some number of events or updates into a batch file. The number of events or updates may be determined by the Flash client dynamically or determined by game networking system 120b based on server loads or other factors. For example, client system 530 may send a batch file to game networking system 120b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 530. In particular embodiments, the batch file may be a text file and the name-value pairs may be in string format.

In particular embodiments, when a player plays an online game on client system 530, game networking system 120b may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 120b may retrieve the corresponding BLOB from the database to determine the most-recent values of the game-related data. In particular embodiments, while a player is playing the online game, game networking system 120b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 6:
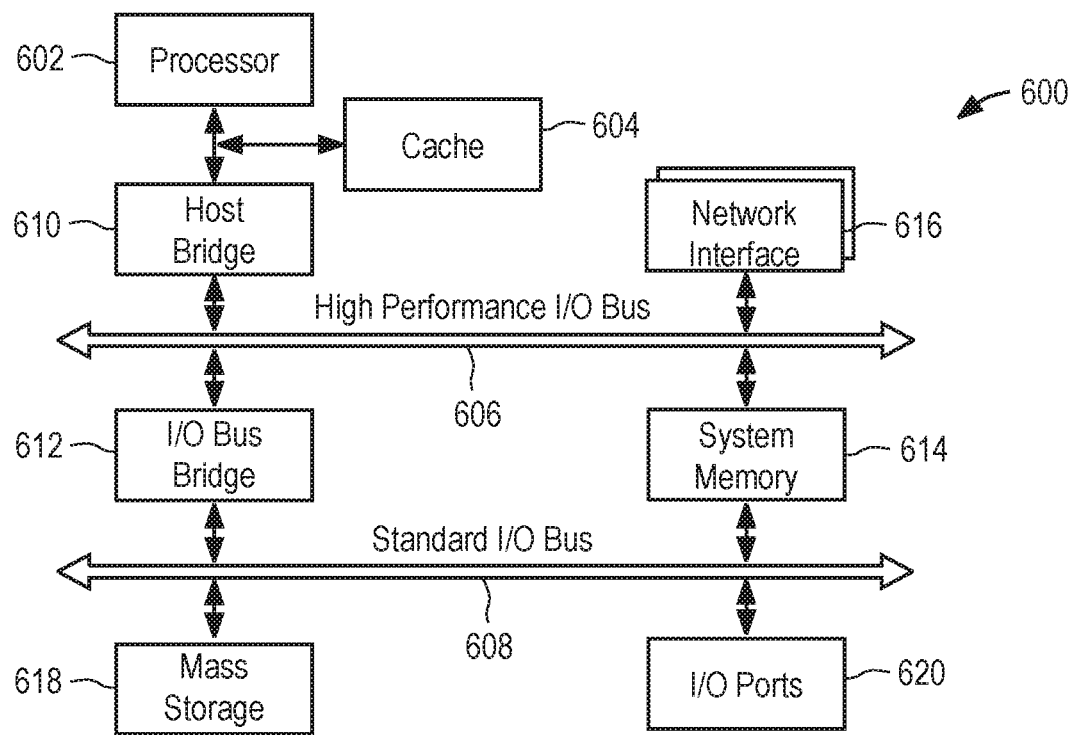
FIG. 6 illustrates an example computing system architecture, which may be used to implement a server or a client system illustrated in FIG. 7, according to some example embodiments.
Figure 7:
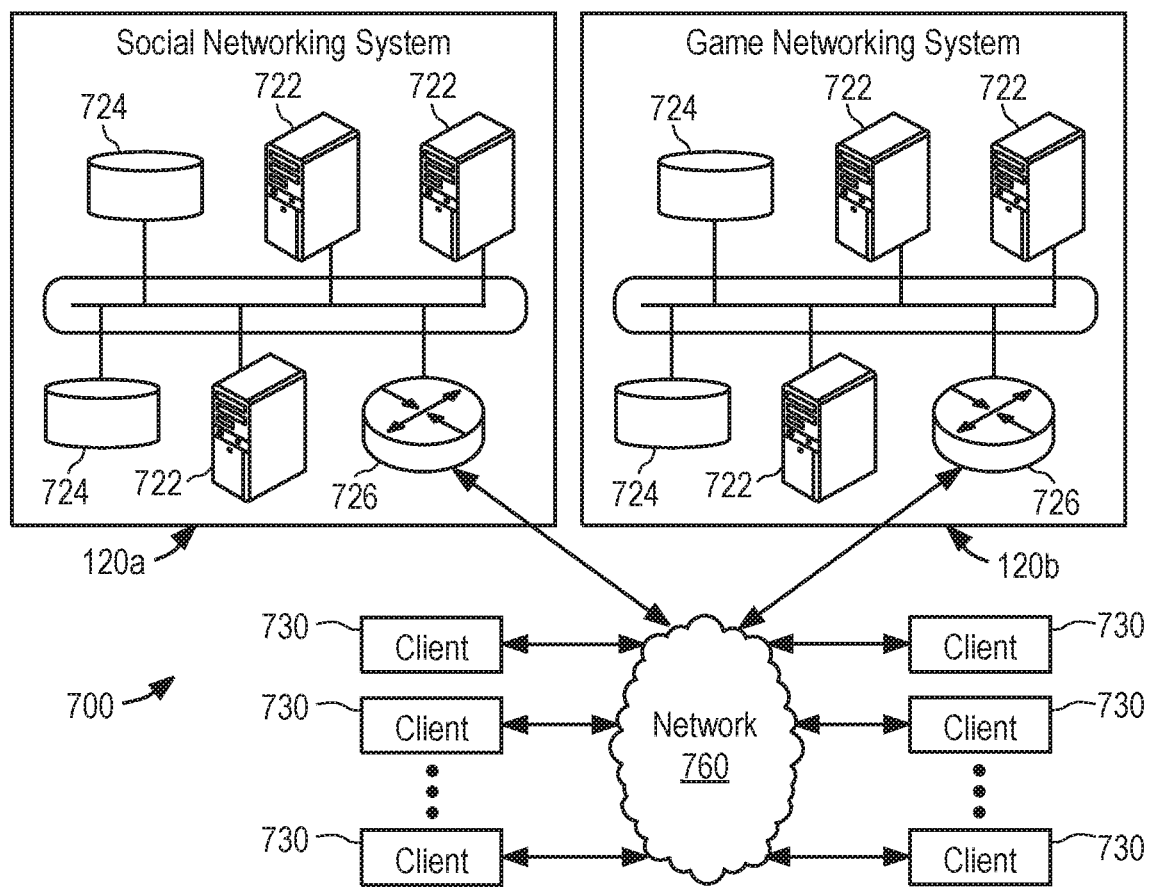
FIG. 7 illustrates an example network environment, in which various example embodiments may operate.

FIG. 6 illustrates an example computing system architecture, which may be used to implement a server 722 or a client system 730 illustrated in FIG. 7. In one embodiment, hardware system 600 comprises a processor 602, a cache memory 604, and one or more executable modules and drivers, stored on a tangible computer readable medium, directed to the functions described herein. Additionally, hardware system 600 may include a high performance input/output (I/O) bus 606 and a standard I/O bus 608. A host bridge 610 may couple processor 602 to high performance I/O bus 606, whereas I/O bus bridge 612 couples the two buses 606 and 608 to each other. A system memory 614 and one or more network/communication interfaces 616 may couple to bus 606. Hardware system 600 may further include video memory (not shown) and a display device coupled to the video memory. Mass storage 618 and I/O ports 620 may couple to bus 608. Hardware system 600 may optionally include a keyboard, a pointing device, and a display device (not shown) coupled to bus 608. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 600 are described in greater detail below. In particular, network interface 616 provides communication between hardware system 600 and any of a wide range of networks, such as an Ethernet (e.g., IEEE 802.3) network, a backplane, etc. Mass storage 618 provides permanent storage for the data and programming instructions to perform the above-described functions implemented in servers 1022, whereas system memory 614 (e.g., DRAM) provides temporary storage for the data and programming instructions when executed by processor 602. I/O ports 620 are one or more serial and/or parallel communication ports that provide communication between additional peripheral devices, which may be coupled to hardware system 600.

Hardware system 600 may include a variety of system architectures and various components of hardware system 600 may be rearranged. For example, cache 604 may be on-chip with processor 602. Alternatively, cache 604 and processor 602 may be packed together as a "processor module," with processor 602 being referred to as the "processor core." Furthermore, certain embodiments of the present disclosure may not require nor include all of the above components. For example, the peripheral devices shown coupled to standard I/O bus 608 may couple to high performance I/O bus 606. In addition, in some embodiments, only a single bus may exist, with the components of hardware system 600 being coupled to the single bus. Furthermore, hardware system 600 may include additional components, such as additional processors, storage devices, or memories.

An operating system manages and controls the operation of hardware system 600, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft (r) Windows(r) operating systems, BSD operating systems, and the like. Of course, other embodiments are possible. For example, the functions described herein may be implemented in firmware or on an application-specific integrated circuit. Particular embodiments may operate in a wide area network environment, such as the Internet, including multiple network addressable systems.

FIG. 7 illustrates an example network environment, in which various example embodiments may operate. Network cloud 760 generally represents one or more interconnected networks, over which the systems and hosts described herein can communicate. Network cloud 760 may include packet-based wide area networks (such as the Internet), private networks, wireless networks, satellite networks, cellular networks, paging networks, and the like. As FIG. 7 illustrates, particular embodiments may operate in a network environment comprising one or more networking systems, such as social networking system 120a, game networking system 120b, and one or more client systems 730. The components of social networking system 120a and game networking system 120b operate analogously; as such, hereinafter they may be referred to simply at networking system 720. Client systems 730 are operably connected to the network environment via a network service provider, a wireless carrier, or any other suitable means.

Networking system 120 is a network addressable system that, in various example embodiments, comprises one or more physical servers 722 and data stores 724. The one or more physical servers 722 are operably connected to computer network 760 via, by way of example, a set of routers and/or networking switches 726. In an example embodiment, the functionality hosted by the one or more physical servers 722 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 722 may host functionality directed to the operations of networking system 720. Hereinafter servers 722 may be referred to as server 722, although server 722 may include numerous servers hosting, for example, networking system 720, as well as other content distribution servers, data stores, and databases. Data store 724 may store content and data relating to, and enabling, operation of networking system 720 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 724 corresponds to one or more of a variety of separate and integrated databases, such as relational databases and object-oriented databases, that maintain information as an integrated collection of logically related records or files stored on one or more physical systems. Structurally, data store 724 may generally include one or more of a large class of data storage and management systems. In particular embodiments, data store 724 may be implemented by any suitable physical system(s) including components, such as one or more database servers, mass storage media, media library systems, storage area networks, data storage clouds, and the like. In one example embodiment, data store 724 includes one or more servers, databases (e.g., MySQL), and/or data warehouses. Data store 724 may include data associated with different networking system 720 users and/or client systems 730.

Client system 730 is generally a computer or computing device including functionality for communicating (e.g., remotely) over a computer network. Client system 730 may be a desktop computer, laptop computer, personal digital assistant (PDA), in- or out-of-car navigation system, smart phone or other cellular or mobile phone, or mobile gaming device, among other suitable computing devices. Client system 730 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 730 to enter addresses of specific network resources to be retrieved, such as resources hosted by networking system 720. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 730 desires to view a particular webpage (hereinafter also referred to as target structured document) hosted by networking system 720, the user's web browser, or other document Sequence Generator or suitable client application, formulates and transmits a request to networking system 720. The request generally includes a URL or other document identifier as well as metadata or other information. By way of example, the request may include information identifying the user, such as a user ID, as well as information identifying or characterizing the web browser or operating system running on the user's client computing device 730. The request may also include location information identifying a geographic location of the user's client system or a logical network location of the user's client system. The request may also include a timestamp identifying when the request was transmitted.

Although the example network environment described above and illustrated in FIG. 7 described with respect to social networking system 120*a* and game networking system 120*b*, this disclosure encompasses any suitable network environment using any suitable systems. As an example and not by way of limitation, the network environment may include online media systems, online reviewing systems, online search engines, online advertising systems, or any combination of two or more such systems.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented method, comprising:
   calculating a player skill level for a player of a computer-implemented game based at least on a plurality of game moves in a first game level completed by the player;
   prior to game play of the player in a second game level, automatically modifying at least one attribute of the second game level based on the player skill level to produce a plurality of modified attributes;
monitoring initial game play of the player in the second game level, which initial game play is implemented according to a set of level attributes that exclude the plurality of modified attributes;
identifying a difference between a current rate of progression of the player through the second game level and a reference rate of progression for the second game level;
based on an extent of the difference between the current rate of progression and the reference rate of progression, automatically selecting one of the plurality of modified attributes for activation in the second game level; and
in an automated operation using one or more computer processor devices, automatically modifying game play difficulty of the second game level by triggering the selected modified attribute of the second game level, such that subsequent game play in the second game level is implemented based at least in part on the selected modified attribute.

2. The computer-implemented method of claim 1, comprising:
calculating the reference rate of progression based at least on one or more game moves of a plurality of players in the second game level, wherein the reference rate of progression comprises a threshold range of a desirable rate of progression towards at least one of: a conclusion of the second game level and a second game level purchase decision.

3. The computer-implemented method of claim 1, wherein modifying at least one attribute of a second game level comprises:
prior to any game play of the player in the second game level, modifying, based on the player skill level, a number of instances of a type of a virtual object available for presentation to the player during game play in the second game level of a type of a virtual object available.

4. The computer-implemented method of claim 1, wherein modifying at least one attribute of a second game level comprises:
prior to any game play of the player in the second game level, modifying, based on the player skill level, a rate of appearance of a type of a virtual object available for presentation to the player during game play in the second game level of a type of a virtual object available.

5. The computer-implemented method of claim 4, wherein modifying, based on the player skill level, a rate of appearance of a type of a virtual object comprises:
modifying a rate of appearance of a barrel-type virtual object appears, wherein the receipt of a particular type of a virtual object by the barrel-type object eliminates all instances of the particular type of the virtual object from a game state of the second game level.

6. The computer-implemented method of claim 1, wherein calculating a player skill level for a player based at least on a plurality of game moves in a first game level completed by the player comprises:
calculating the player skill level based on at least one of:
(1) an extent of a difference between the player's number of attempts for a game goal and a reference number of attempts for the game goal,
(2) an extent of a difference between a pattern of virtual objects selected by the player and a reference pattern of virtual objects, and
(3) an extent of a difference between an amount of in-game points earned by the player and a reference amount of in-game points.

7. A non-transitory computer-readable medium storing executable instructions thereon, which, when executed by a processor, cause the processor to perform operations including:
calculating a player skill level for a player of a computer-implemented game based at least on a plurality of game moves in a first game level completed by the player;
prior to game play of the player in a second game level, automatically modifying at least one attribute of the second game level based on the player skill level to produce a plurality of modified attributes;
monitoring initial game play of the player in the second game level, which initial game play is implemented according to a set of level attributes that exclude the plurality of modified attributes;
identifying a difference between a current rate of progression of the player through the second game level and a reference rate of progression for the second game level;
based on an extent of the difference between the current rate of progression and the reference rate of progression, automatically selecting one of the plurality of modified attributes for activation in the second game level; and
automatically modifying game play difficult of the second game level by triggering the selected modified attribute of the second game level, such that subsequent game play in the second game level is implemented based at least in part on the selected modified attribute.

8. The non-transitory computer-readable medium of claim 7, wherein the operations further include:
calculating the reference rate of progression based at least on one or more game moves of a plurality of players in the second game level, wherein the reference rate of progression comprises a threshold range of a desirable rate of progression towards at least one of: a conclusion of the second game level and a second game level purchase decision.

9. The non-transitory computer-readable medium of claim 7, wherein modifying at least one attribute of a second game level comprises:
prior to any game play of the player in the second game level, modifying, based on the player skill level, a number of instances of a type of a virtual object available for presentation to the player during game play in the second game level of a type of a virtual object available.

10. The non-transitory computer-readable medium of claim 7, wherein modifying at least one attribute of a second game level comprises:
prior to any game play of the player in the second game level, modifying, based on the player skill level, a rate of appearance of a type of a virtual object available for presentation to the player during game play in the second game level of a type of a virtual object available.

11. The non-transitory computer-readable medium of claim 10, wherein modifying, based on the player skill level, a rate of appearance of a type of a virtual object comprises:
modifying a rate of appearance of a barrel-type virtual object appears, wherein the receipt of a particular type of a virtual object by the barrel-type object eliminates all instances of the particular type of the virtual object from a game state of the second game level.

12. The non-transitory computer-readable medium of claim 7, wherein calculating a player skill level for a player based at least on a plurality of game moves in a first game level completed by the player comprises:
calculating the player skill level based on at least one of:
(1) an extent of a difference between the player's number of attempts for a game goal and a reference number of attempts for the game goal,
(2) an extent of a difference between a pattern of virtual objects selected by the player and a reference pattern of virtual objects, and
(3) an extent of a difference between an amount of in-game points earned by the player and a reference amount of in-game points.

13. A computer system comprising:
a processor; and
a memory device holding an instruction set executable on the processor to cause the computer system to perform operations comprising:
calculating a player skill level for a player of a computer-implemented game based at least on a plurality of game moves in a first game level completed by the player;
prior to game play of the player in a second game level, automatically modifying at least one attribute of the second game level based on the player skill level—to produce a plurality of modified attributes;
monitoring initial game play of the player in the second game level, which initial game play is implemented according to a set of level attributes that exclude the plurality of modified attributes;
identifying a difference between a current rate of progression of the player through the second game level and a reference rate of progression for the second game level;
based on an extent of the difference between the current rate of progression and the reference rate of progression, automatically selecting one of the plurality of modified attributes for activation in the second game level; and
automatically modifying game play difficulty of the second game level by triggering the selected modified attribute of the second game level, such that subsequent game play in the second game level is implemented based at least in part on the selected modified attribute.

14. The computer system of claim 13, wherein the operations further comprise:
calculating the reference rate of progression based at least on one or more game moves of a plurality of players in the second game level, wherein the reference rate of progression comprises a threshold range of a desirable rate of progression towards at least one of: a conclusion of the second game level and a second game level purchase decision.

15. The computer system of claim 13, wherein modifying at least one attribute of a second game level comprises:
prior to any game play of the player in the second game level, modifying, based on the player skill level, a number of instances of a type of a virtual object available for presentation to the player during game play in the second game level of a type of a virtual object available.

16. The computer system of claim 13, wherein modifying at least one attribute of a second game level comprises:
prior to any game play of the player in the second game level, modifying, based on the player skill level, a rate of appearance of a type of a virtual object available for presentation to the player during game play in the second game level of a type of a virtual object available.

17. The computer system of claim 16, wherein modifying, based on the player skill level, a rate of appearance of a type of a virtual object comprises:
modifying a rate of appearance of a barrel-type virtual object appears, wherein the receipt of a particular type of a virtual object by he barrel-type object eliminates all instances of the particular type of the virtual object from a game state of the second game level.

18. The computer system of claim 13, wherein modifying at least one attribute of a second game level comprises:
prior to any game play of the player in the second game level, modifying a rate of appearance of a elimination attribute appears, wherein the elimination attribute triggers removal of a plurality of virtual objects of a same type from a game state of the second game level.

19. The computer system of claim 13, wherein modifying at least one attribute of a second game level comprises:
prior to any game play of the player in the second game level, modifying, based on the player skill level a rate of appearance of an option for a type of an in-game purchase transaction.

20. The computer system of claim 13, wherein calculating a player skill level for a player based at least on a plurality of game moves in a first game level completed by the player comprises:
calculating the player skill level based at least one an extent of a difference between a pattern of use by the player of virtual objects that provide bonus points and a reference pattern of use of bonus virtual objects.

* * * * *

UNITED STATES PATENT AND TRADEMARK OFFICE
CERTIFICATE OF CORRECTION

PATENT NO. : 10,987,589 B2
APPLICATION NO. : 16/427925
DATED : April 27, 2021
INVENTOR(S) : Lai et al.

It is certified that error appears in the above-identified patent and that said Letters Patent is hereby corrected as shown below:

On the Title Page

On page 3, in Column 2, item (56) under "Other Publications", Line 19, delete "Modificationo" and insert --Modification-- therefor On page 3, in Column 2, item (56) under "Other Publications", Line 21, delete "Sep. 2015," and insert --Sep. 9, 2015,-- therefor On page 4, in Column 2, item (56) under "Other Publications", Line 16, delete "Actio" and insert --Action-- therefor On page 4, in Column 2, item (56) under "Other Publications", Line 44, delete "maled" and insert --dated-- therefor On page 5, in Column 2, item (56) under "Other Publications", Line 13, delete "1312" and insert --1.312-- therefor In the Specification In Column 15, Line 7, delete "120$bb$" and insert --120$b$-- therefor In Column 15, Line 9, delete "535," and insert --525,-- therefor In Column 19, Line 24, delete "1022," and insert --722,-- therefor In Column 21, Line 33, after "document", insert --;--

In the Claims

In Column 23, Line 6, in Claim 1, delete "attributes:" and insert --attributes;-- therefor Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*

In Column 24, Line 28, in Claim 7, delete "difficult" and insert --difficulty-- therefor In Column 25, Line 26, in Claim 13, delete "level-to" and insert --level to-- therefor In Column 26, Line 27, in Claim 17, delete "he" and insert --the-- therefor